Figure 1:
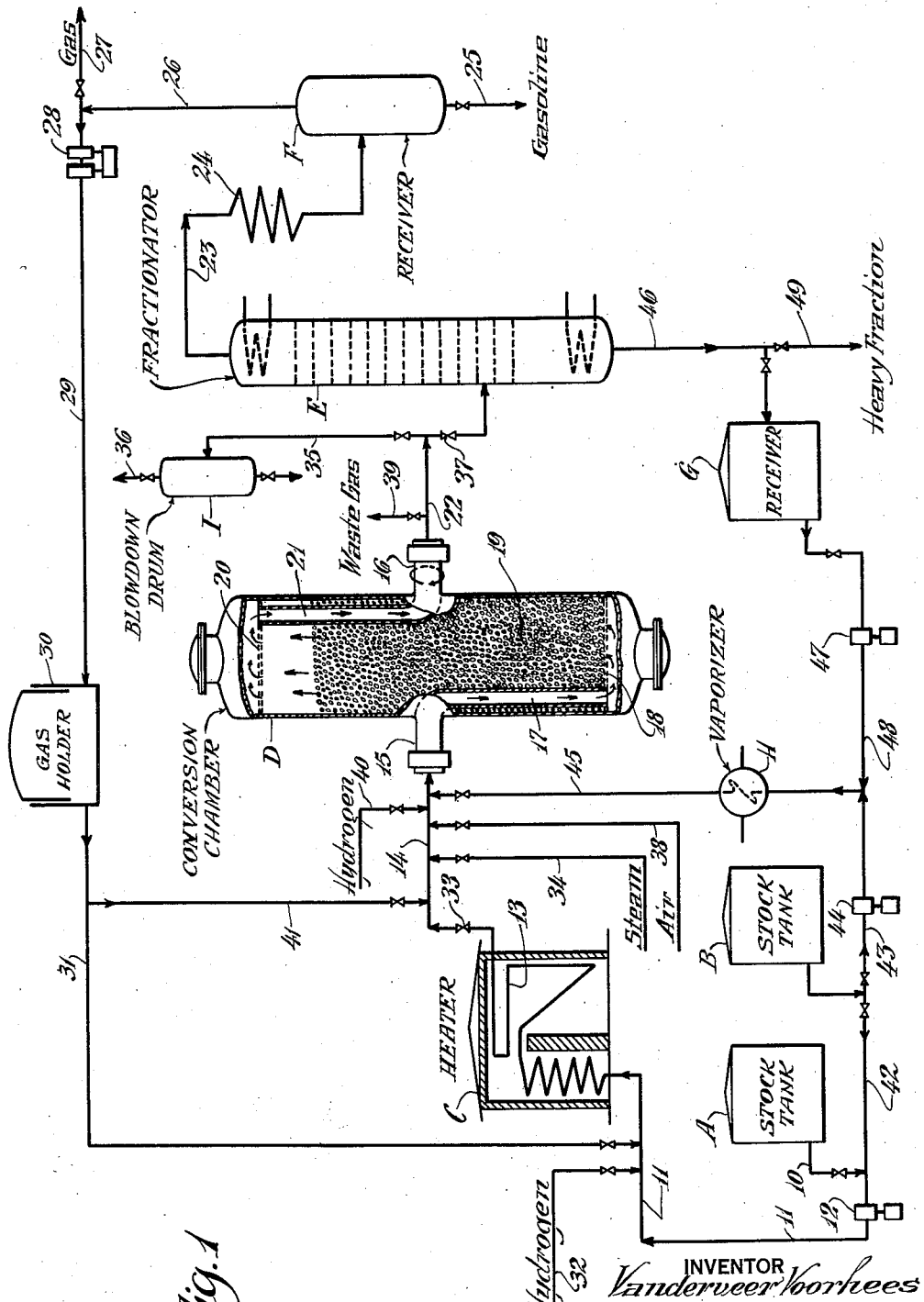

July 21, 1942.  V. VOORHEES  2,290,845
CATALYTIC PROCESS FOR TREATING HYDROCARBONS
Filed Sept. 13, 1939  2 Sheets-Sheet 1

INVENTOR
Vanderveer Voorhees
BY
Pike H. Sullivan
ATTORNEY

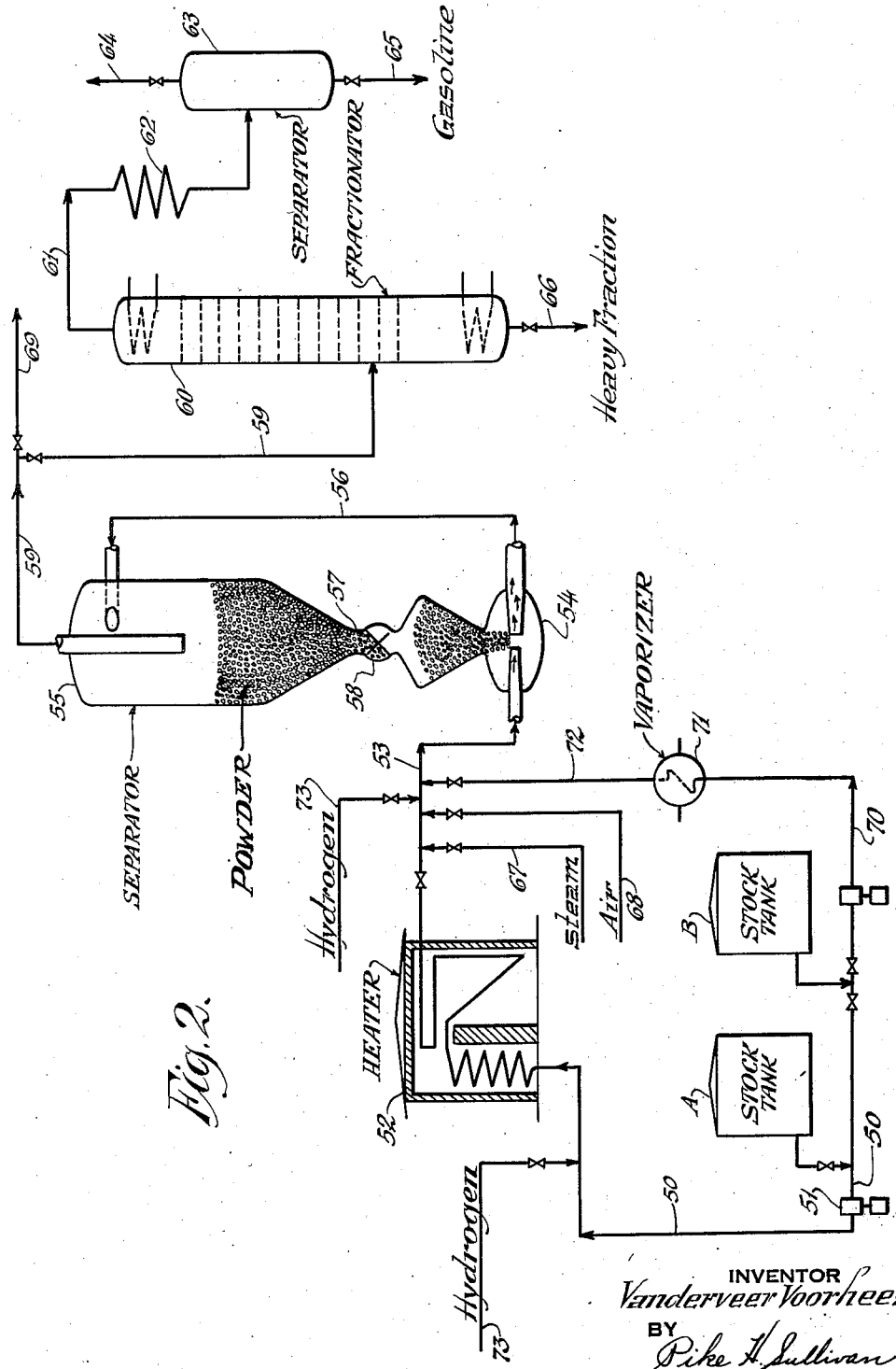

Patented July 21, 1942

2,290,845

UNITED STATES PATENT OFFICE 2,290,845

CATALYTIC PROCESS FOR TREATING HYDROCARBONS

Vanderveer Voorhees, Hammond, Ind., assignor to Standard Oil Company, Chicago, Ill., a corporation of Indiana Application September 13, 1939, Serial No. 294,778

9 Claims. (Cl. 196—52)

This invention relates to the conversion of hydrocarbon oils by the action of catalysts and particularly surface type catalysts, such as metal oxides, silicates and artificially prepared inorganic compounds and mixtures. One object of the invention is to convert petroleum distillates, such as naphthas, gasoline, products of straight distillation of crude petroleum or cracking still distillates, into motor fuels having a high knock rating. A specific object of the invention is to effect the conversion of petroleum distillates into high knock rating motor fuels rich in aromatic hydrocarbons in the presence of catalysts and hydrogen at a high conversion temperature above 850° F. and supply the heat for the process by controlled combustion of the by-product carbon produced in the process and deposited on the catalyst. A still more specific object of the invention is to utilize the heat of combustion of the by-product carbon in a novel manner and more effectively than heretofore.

In carrying out my process, I employ a short cycle time for the combustion of the carbon and the conversion of the oil to produce exactly the amount of heat required for the process, taking advantage of the heat storing capacity of the catalyst for transferring the heat of combustion of the carbon to the oil conversion step of the process. One feature of the invention is the use of a special carbon-forming distillate to control the amount of carbon deposited on the catalyst. Special means of mixing the catalyst are provided for obtaining a uniform temperature in the catalyst after the regeneration step by which the carbon is removed. Heat retaining materials may also be mixed with the catalyst to assist in transferring heat from the catalyst regeneration step to the hydrocarbon conversion step.

The invention is illustrated by drawings in which Figure 1 shows diagrammatically suitable apparatus for carrying it out and Figure 2 shows an alternative modification employing catalyst in powdered form.

Referring to Figure 1, hydrocarbon supply reservoirs A and B are connected to pipe heater C where the oil is vaporized. The oil vapors are converted in catalyst converter D and the products are fractionated in fractionating tower E. Gasoline is collected in separator F while heavier stock is accumulated in storage tank G from which it may be vaporized in vaporizer H and recycled to the converter. A blowdown tank, I, may be employed during the catalyst regeneration cycle.

In a typical operation the heavy naphtha, for example, a Mid-Continent naphtha fraction boiling between about 250 and 425° F., may be withdrawn from reservoir A through valved line 10 and line 11 leading to pump 12 which forces it through coil 13 in heater C. The naphtha is vaporized in C and the vapors are heated to a high temperature, for example, 850 to 950° F. Lower or higher temperatures may be employed, depending upon the process conditions and the amount of heat derived from the regeneration of the catalyst. Thus, when a large amount of heat is made available from the catalyst regeneration, I may heat the vapors in coil 13 to a temperature of only about 700 to 750° F. Where less heat is available from the regeneration, it may be desirable to heat the vapors in coil 13 to a temperature of 950 to 1000° F.

From coil 13 the vapors are led by transfer line 14 to converter D which is charged with the granular conversion catalyst. In the drawings the converter is shown mounted on trunnions 15 and 16 on which it may be rotated for mixing and redistributing the catalyst therein, generally at intervals between conversion periods. Vapors from 14 enter trunnion 15 and are conducted through pipe 17 beneath the distributing plate 18 which may be a perforated diaphragm supporting the catalyst 19. The vapors flow upwardly through the catalyst bed and through distributing plate 20 in the top of the chamber, thence downward by pipe 21 to trunnions 16 and thence by line 22 to fractionator E. In fractionator E the products are separated into a gasoline-gas fraction which is withdrawn by vapor line 23, condenser 24 and separator F. In the separator the gasoline condensate is withdrawn by line 25 while gases consisting primarily of methane, ethane and propane together with hydrogen are withdrawn by line 26. Gases may be vented from the system by valved line 27 but I prefer to recycle a substantial portion of the gases by compressor 28 and line 29 leading to gas holder 30. The recycled gases are rich in hydrogen and may contain, for example, from 40 to 80% of hydrogen by volume. If desired, they may be purified to still further increase the hydrogen content before recycling. The recycled gases are conducted from gas holder 30 by line 31 to the inlet of heating coil 13. Additional hydrogen from an external source may be introduced into coil 13 by line 32 and it is frequently necessary to employ external hydrogen when starting up the process. After the operation has begun, however, sufficient hydrogen is produced in the process to supply the needs thereof.

The principal reaction effected by my process is the dehydrogenation and simultaneous cyclization of open-chain or aliphatic hydrocarbons present in the relatively light petroleum naphtha feed stock. The products of this reaction are principally aromatic hydrocarbons and the reaction is conveniently designated as a "dehydroaromatization." The catalysts suitable for effecting the reaction are generally the oxides of the metals of groups IV, V and VI of the periodic system and particularly the oxides of elements found in the left column or subgroup A of these groups. Examples of these metals are chromium, molybdenum, tungsten, vanadium, titanium, zirconium, cerium and thorium. Certain other metal oxides may be employed such as cobalt and nickel oxides. Oxides of these metals may be employed alone but I prefer to use them on a supporting material, preferably on alumina or activated alumina having a porous structure with extensive surface. For example, I may employ 5 to 25% of the oxides of chromium, molybdenum or vanadium or mixtures of these supported on activated alumina and usually 5 to 10% of the oxide is sufficient. The catalyst may be prepared by impregnating activated alumina with a suitable salt of a catalyst metal, for example, ammonium molybdate, chromium nitrate, nickel nitrate, etc. By heating the impregnated alumina, the salt may be decomposed to the oxide. Oxide catalysts prepared in this way are partially reduced to lower oxides or even to the metals in the process, and the reduced catalysts are periodically reoxidized on regeneration of the catalyst by air blowing.

When treating naphtha having the characteristics hereinabove referred to with the catalyst described, it is possible to continue the reaction for a period of about 10 to 20 hours before catalyst activity is substantially impaired. However, in order to supply the heat of reaction for such a long period of time, it is either necessary to heat the catalyst directly or to superheat the hydrocarbon vapors before contacting them with the catalyst. A serious objection to superheating the vapors results from the thermal cracking by which hydrocarbon motor fuels of relatively low knock rating are produced, either in the absence of the catalyst or in the presence of partially deactivated catalyst. Under these conditions, the desired aromatic hydrocarbons are not obtained. I maintain the temperature of the catalyst at a point approaching the optimum temperature for aromatization for any particular hydrocarbon stock treated and severe superheating of the vapors in the absence of the catalyst is avoided. Thus, I may introduce hydrocarbon vapors into catalyst chamber D by line 14 at a temperature of about 950° F., the temperature of the catalyst contained in reaction chamber D being also about 950° F. The rate of heating the oil vapors is sufficiently rapid to substantially avoid cracking during the heating step. When the temperature of the catalyst has dropped to about 925° F. or 900° F., it may be no longer economic to continue the reaction because of the lowered rate. The operation is then interrupted by closing valve 33 and purging the catalyst of the hydrocarbon vapors by blowing with steam or inert gas introduced by line 34. Purged hydrocarbons and steam may be conducted by line 22 into fractionator E or by line 35 into blowdown chamber I where steam and hydrocarbons are condensed and gases are vented by line 36. After purging is completed, valve 37 in line 22 may be closed and air or other oxidizing gas, for example, air diluted with flue gas to lower the oxygen concentration, may be introduced by valved line 38. The air passing through the catalyst consumes the by-product carbon deposited thereon and the waste regeneration gases are withdrawn by line 39. Combustion of carbon on the catalyst surface restores the temperature thereof to about 950° F. or above, for example, 975 to 1050° F. Air is then purged from the catalyst by steam or inert gas admitted by line 34 and hydrocarbon vapors are again introduced from transfer line 14, the cycle being repeated continually. Before introducing the hydrocarbon vapors from furnace C, however, I may preliminarily treat the catalyst by hydrogen introduced by line 40 or by recycled gases withdrawn from gas holder 30 by line 41. Pretreatment of the freshly regenerated and hot catalyst serves to initially reduce certain metal oxides of the catalyst which are oxidized to an abnormally high state of oxidation during the combustion cycle. As a result of the pretreatment of catalyst with hydrogen, better control of the amount of carbon deposited on the catalyst by the naphtha vapors is obtained.

As previously indicated, the naphtha employed in my process is preferably a petroleum distillate fraction boiling within the range of about 250 to 450° F. and narrower boiling naphthas may be used, for example, naphthas boiling within the range of about 280 to 410° F. Certain advantages result from the use of narrow boiling range naphtha charging stock. For example, I find that the narrower the boiling range of the charging stock employed, the more complete the conversion to aromatic hydrocarbons. The narrow boiling range naphthas are more homogeneous in their chemical composition and optimum conditions for aromatization are more readily obtained. Accordingly, it is sometimes desirable to employ naphthas having a boiling range of only 50 to 100° F.

When using naphthas of low boiling point and narrow boiling range, the amount of carbon deposited on the catalyst may be insufficient to supply the heat necessary on regeneration to restore the catalyst to the initial desired temperature, e. g., 975° F. In this case, I may introduce a regulated amount of secondary stock from supply reservoir B. The secondary stock may be a kerosene or gas oil fraction having a higher boiling point than the naphtha undergoing treatment. One of the characteristics of the heavier fraction employed as the secondary stock is that it forms and deposits carbon when brought in contact with the hot aromatizing catalyst. The secondary stock may be alternately or concurrently charged with the naphtha from tank A, the secondary stock being conducted by line 42 through line 11 and pump 12, thence into C and by transfer line 14 to catalyst chamber D. In order not to interrupt the operation in heater C, it may be desirable to conduct the secondary stock by line 43 and pump 44 to vaporizer H where it may be vaporized and conducted by line 45 to conversion chamber D. In addition to or instead of secondary stock from B, I may likewise employ the heavier-than-gasoline fraction withdrawn from the bottom of fractionator E by line 46 leading to reservoir G from which the stock is withdrawn by pump 47 and discharged by line 48 into vaporizer H and thence by line 45 to conversion chamber D. Excess heavy fraction from E may also be discarded from the system, if desired, by valved line 49.

The heavier secondary stock which may have a boiling range of about 400 to 650° F. is passed through the catalyst either in the presence or absence of hydrogen or recycle gas for a sufficient period of time to deposit on the catalyst an amount of carbon or other carbonaceous products to provide the necessary heat energy for the next cycle of catalyst conversion. The amount of secondary oil necessary for this purpose depends upon its boiling range and chemical composition. Highly paraffinic stocks generally produce less carbon than do the naphthenic or asphaltic type stocks. In order to increase the rate of carbon deposition from the secondary stock, I may employ a relatively long time of contact, for example, a time of contact indicated by a charging rate of about 0.1 or 0.5 to 1 liquid volume of oil per volume of catalyst per hour. When charging naphtha during the aromatizing cycle of the process, I may employ contact times indicated by the space velocity or rate of 0.5 to 10 volumes of oil per apparent volume of catalyst per hour but I prefer to operate at the rate of about 1 to 2 volumes per volume per hour.

The secondary carbonizing stock may be aromatic in nature; for example, it may contain naphthalene derivatives which have a high carbonizing effect. Extracts of oils obtained with selective solvents are also suitable.

In a typical operation with a catalyst at 975° F., I may introduce naphtha vapors at a temperature of about 975° F. for a period of about 60 minutes. In this period the temperature of the catalyst may fall to about 900° F. as a result of the endothermic absorption of heat by the aromatizing reaction. The steam and naphtha vapors are then shut off from the reaction chamber D and it is preferred to direct this steam to a second or third reaction chamber similar to D. The secondary carbonizing oil which may be a typical Mid-Continent gas oil may then be introduced into the catalyst through vaporizer H. The treatment of the catalyst with the secondary oil may continue for several minutes, for example, from 10 to 20 minutes, until the desired deposit of carbon for regeneration has been formed, after which time the secondary oil stream is interrupted and the catalyst purged of hydrocarbon vapor as hereinbefore described. The catalyst is then regenerated with oxidizing gas and simultaneously brought back to the desired conversion temperature, in this case 975° F. The conversion of naphtha from reservoir A is then repeated. The time required for catalyst regeneration may be about 5 to 30 minutes.

In order to hasten the regeneration of the catalyst and avoid local overheating, due to the rapid reaction with oxidizing gas, I may agitate the catalyst during the regeneration cycle. As indicated in the drawings, I may mount the converter D on trunnions 15 and 16 and rotate it while introducing regenerating gas. The net result of the rotation is to agitate the catalyst therein while the gas is passing through it, thus avoiding channelling and local overheating. The rotation of the catalyst chamber also serves to rearrange and redeposit the catalyst, thereby preventing the development of permanent channels therethrough. If desired, the catalyst may be regenerated for a number of cycles without agitation and then regenerated for one or more cycles with agitation, care being taken to control the rate of regeneration, e. g., the oxygen concentration of the gas admitted by 38, etc. to avoid excessive temperature which would damage the catalyst. Certain catalysts may be heated to about 1100° F. without permanent deactivation. Other catalysts may be heated to 1200 to 1400° F. without serious injury. Chromium and molybdenum oxides on alumina are examples of the latter.

If desired, I may employ heat retaining means or heat carriers with the catalyst in my process. A satisfactory heat retainer is a quartz sand having about the same granule size as the oxide catalyst employed. It may be mixed with the catalyst, for example, in the proportion of about 1 to 5 parts of catalyst with 5 parts of sand. The sand absorbs the heat of decarbonization, retains it and makes it available for further hydrocarbon conversion in the next cycle. Granulated metal, wires, rods or other fragmentary form of material may also be employed as heat retainers.

Referring to Figure 2 of the drawings which illustrates a modification of the process adapted to the use of powdered catalyst, naphtha charging stock from tank A may be conducted by line 50 and pump 51 to heater 52 where it is vaporized, as previously described in connection with Figure 1. The vapors are conducted by line 53 to Venturi mixer 54 where the vapors are mixed with powdered catalyst, from separator 55. The mixture of powdered catalyst and hot naphtha vapors is conducted by line 56 to the cyclone separator 55 wherein the vapors are permitted to separate from the powdered catalyst which then falls to the bottom of the separator and is drawn off by line 57 equipped with metering catalyst valve 58 which may be of the rotating type. The catalyst falls into the dispersion apparatus 54 previously mentioned wherein the catalyst may suitably be drawn into a high velocity stream of vapors from 53 and forced into discharge line 56, the dispersion of the catalyst in the fast flowing vapors being substantially instantaneous. The amount of catalyst introduced into the vapors in this way may be regulated by valve 58 and in ordinary practice from 1 to 3 parts per part of hydrocarbon treated is a desirable ratio.

Converted hydrocarbon vapors are drawn off from the separator 55 by line 59 and are conducted to fractionator 60 where gasoline and gases are separated and withdrawn by vapor line 61 leading to condenser 62 and separator 63 from which gas is removed by vent line 64 and gasoline is withdrawn by line 65. Hydrocarbon products heavier than gasoline are withdrawn from fractionator 60 by line 66 and, if desired, may be recycled in the conversion process as described in connection with Figure 1.

After the catalyst is recycled for a period of time until a definite amount of carbon has deposited on it and its activity has substantially diminished, it may be regenerated in situ by cutting off the hydrocarbon vapors from heater 52, purging the catalyst of hydrocarbon vapors by admitting steam through valved line 67 and then admitting an oxidizing gas, such as diluted air, by line 68. The oxidizing gas burns the carbon from the catalyst while it is being recirculated in line 56 and separator 55, the spent combustion gases being led away through line 59 and valved vent line 69, the valve in line 59 leading to fractionator 60 being closed.

As previously described in connection with Figure 1, the conversion cycle is regulated to deposit on the catalyst the proper amount of by-product carbon necessary for restoring the temperature of the catalyst to the desired point, for example, 950° F. To this end, the hydrocarbon conversion time may be very short, for example, 2 to 20 minutes. Oxidation then restores the catalyst activity as well as restoring the desired temperature for the next conversion cycle.

Where the amount of carbon is insufficient to restore the temperature of the catalyst on regeneration, I may introduce a carbonizing stock from storage tank B. This stock may be a gas oil, kerosene or other higher boiling stock, such as described hereinabove in connection with Figure 1. The carbonizing oil from B may flow through valved line 70 to vaporizer 71 and thence through valved line 72 and by lines 53 and 56 to the catalyst converter 55. Sufficient carbonizing stock is introduced into the catalyst bed to deposit the desired amount of carbon on the catalyst for regeneration. If desired, the carbonizing stock may be conducted to line 50 and heater 52, alternating with the naphtha stock from tank A. Hydrogen for the naphtha conversion may be introduced by line 73 or hydrogen-containing gases from 64 may be recycled by a line not shown to the inlet of the process as described in connection with the other modification of the invention.

The amount of carbon necessary to deposit on the catalyst, whereby to restore the catalyst to conversion temperature on later combustion, will vary with the nature of the naphtha being converted and the temperature of the conversion reaction. In general, it will be less than about 1% of the weight of the catalyst, and may be about 0.1 to 0.5%.

When charging my process with a naphtha stock having a knock rating indicated by the octane number of about 40 to 50, I may obtain an aromatic motor fuel having an octane number of about 75 to 85 and containing about 40 to 65% of aromatics. The octane number of the product may be somewhat reduced by the cracking product resulting from conversion of the secondary charging stock which is more subject to thermal decomposition than the naphtha. If desired, however, the products of conversion from the secondary stock may be segregated by charging them to another fractionating column not shown instead of charging them to fractionator E.

Having thus described my invention, what I claim is:

1. The process of aromatizing aliphatic type petroleum naphtha which comprises vaporizing said naphtha and treating the vapors in the presence of hydrogen with a metal oxide aromatizing catalyst at an elevated temperature within the range of about 850 to 1050° F., subsequently contacting said catalyst with vapors of a hydrocarbon having a higher carbon forming tendency than said naphtha, regulating the conditions of reaction to effect aromatization of said aliphatic hydrocarbon and to deposit on the catalyst byproduct carbonaceous matter sufficient to restore the temperature of said catalyst to the desired reaction temperature when said carbonaceous matter is burned, regenerating said catalyst by burning said carbonaceous matter therefrom with an oxygen-containing gas, thereby restoring the catalyst to the desired reaction temperature and simultaneously restoring catalytic activity, treating additional naphtha vapors with said restored catalyst and alternately repeating said regeneration and naphtha conversion.

2. The process of making high knock rating aromatic motor fuels by catalytic aromatization of low knock rating aliphatic hydrocarbon naphthas which comprises vaporizing said naphtha and contacting the vapors with a metal oxide aromatizing catalyst at a temperature of about 850° F. to 1050° F. and in the presence of hydrogen, whereby aliphatic hydrocarbons contained in said naphtha are converted into aromatic hydrocarbons, continuing the conversion of said naphtha hydrocarbons until the temperature of said catalyst has fallen below a satisfactory aromatization temperature as a result of the endothermic heat loss, introducing a secondary heavier hydrocarbon stock into said catalyst, whereby carbon is rapidly deposited thereon and said secondary stock is cracked, continuing the treatment of the catalyst with said secondary stock until sufficient carbon has been deposited to provide the heat necessary for restoring the temperature of said catalyst to the desired aromatizing temperature, interrupting the treatment of the catalyst with said secondary stock and purging said catalyst of hydrocarbon vapors, passing an oxidizing gas through said catalyst to burn said deposited carbon and restore the catalyst to the desired aromatizing reaction temperature and thereafter repeating the cycles of naphtha aromatization, carbon deposition and catalyst regeneration.

3. The process of claim 2 wherein the catalyst is treated with a hydrogen-containing gas subsequent to treatment with oxidizing gas and prior to the naphtha aromatization cycle.

4. The process of claim 2 wherein the said secondary stock is comprised of a heavy fraction, boiling above the gasoline boiling range, separated from the products of the aromatization reaction.

5. The process of claim 2 wherein hydrogen employed with the catalyst during the naphtha aromatizing cycle is contained in the gases produced in the process, and said gases are recycled to catalyst contacting step.

6. The process of converting hydrocarbon oils into high knock rating motor fuels comprising vaporizing a relatively light, low carbon forming aliphatic type petroleum hydrocarbon fraction and heating the vapors to a high conversion temperature, contacting the hot vapors with a solid metal oxide hydrocarbon conversion catalyst until the catalyst activity is substantially reduced, subjecting said catalyst to the action of the vapors of a relatively heavy, high carbon forming hydrocarbon fraction at a high conversion temperature, continuing the flow of said relatively heavy hydrocarbon vapors in contact with said catalyst until a definite amount of carbon is deposited on said catalyst, interrupting the flow of hydrocarbon vapors, subjecting said catalyst to the regenerating action of an oxygen-containing gas whereby said deposited carbon is substantially consumed with liberation of heat and the temperature of said catalyst is restored to a high conversion temperature thereby, and thereafter repeating the cycle of contacting said catalyst first with said low carbon forming fraction, then with said high carbon forming fraction, and then with regenerating gas.

7. In the process of increasing the knock rating of naphtha wherein the vapors of said naphtha are contacted at an elevated temperature of about 850 to 1050° F. with a solid metal oxide aromatizing catalyst and hydrogen which converts aliphatic hydrocarbons contained in said naphtha into aromatic hydrocarbons, the improvement comprising vaporizing said naphtha and dispersing in said vapors a powdered, aromatizing catalyst, maintaining said vapors in contact with said catalyst for a sufficient time to effect substantial aromatization, separating the powdered catalyst from the hydrocarbon reaction product, recycling the separated catalyst and dispersing it in additional hydrocarbon vapors, continuing the dispersion, separation and recycling of catalyst until said catalyst has accumulated a controlled amount of by-product carbon from said aromatizing reaction which is sufficient to restore the temperature of said catalyst on subsequent combustion, adjusting the amount of carbon deposited on said catalyst by introducing a regulated amount of heavier carbonizing oil into the catalytic conversion system, interrupting the treatment of hydrocarbon vapors with said catalyst and subjecting said catalyst to the action of an oxidizing gas, whereby said carbon deposit is substantially burned off and the temperature of said catalyst is restored to the desired aromatizing reaction temperature by the heat of combustion and without external heating, then continuing the treatment of naphtha vapors with the regenerated catalyst.

8. The process of converting hydrocarbon oils into high knock rating motor fuels comprising contacting a petroleum hydrocarbon fraction of relatively low carbon forming type at a high conversion temperature with a solid metal oxide aromatizing catalyst until the aromatizing activity is substantially reduced, then contacting said catalyst with a heavier hydrocarbon fraction of relatively high carbon forming type at a high conversion temperature, continuing the treatment of said heavier hydrocarbon fraction until a substantially increased amount of carbon is deposited on said catalyst, interrupting the treatment of hydrocarbons, subjecting said catalyst to the regenerating action of an oxygen-containing gas whereby said deposited carbon is substantially consumed with generation of heat, thereby restoring the temperature of said catalyst to the desired high conversion temperature, agitating the catalyst during said conversion and regeneration operations, and repeating the cycle of contacting said catalyst first with said low carbon forming fraction, then with said high carbon forming fraction and then with regenerating gas.

9. The process of claim 8 wherein the temperature of the catalyst is restored on regeneration to about 1050 to 1100° F.

VANDERVEER VOORHEES.